United States Patent [19]

Ozawa et al.

[11] 4,365,254
[45] Dec. 21, 1982

[54] TWO-COLOR RECORDING PAPER AND METHOD AND RECORDING APPARATUS UTILIZING THE TWO-COLOR RECORDING PAPER

[75] Inventors: Masaru Ozawa; Yuji Ooba; Toshio Shimizu, all of Yokosuka, Japan

[73] Assignee: Nippon Telegraph and Telephone Public Corp., Tokyo, Japan

[21] Appl. No.: 335,083

[22] Filed: Dec. 28, 1981

Related U.S. Application Data

[62] Division of Ser. No. 181,896, Aug. 27, 1980, Pat. No. 4,328,977.

[51] Int. Cl.³ .................. G01D 15/10; G01D 15/34
[52] U.S. Cl. .................. 346/1.1; 346/76 PH; 346/135.1; 430/258
[58] Field of Search .......... 346/1, 76 PH, 135.1; 430/258, 348–350, 964

[56] References Cited

U.S. PATENT DOCUMENTS

| 3,301,697 | 1/1967 | Russell | 430/348 X |
| 4,174,216 | 11/1979 | Cohen et al. | 430/258 X |
| 4,271,255 | 6/1981 | Cho et al. | 430/258 X |

*Primary Examiner*—George H. Miller, Jr.
*Attorney, Agent, or Firm*—Blakely, Sokoloff, Taylor & Zafman

[57] ABSTRACT

Two-color recording paper comprising an ink film and a thermosensitive recording paper which are separably mated together. The ink film has a thin film base and an ink layer of a first hue coated on the film base. The ink layer contains a mixture of a colored material such as dye with a thermoplastic material which is solid at ordinary temperature and becomes fluid at high temperature. The thermosensitive recording paper has a substrate and a coloring layer coated on the substrate. The coloring layer contains a developer which colors in a second hue different from the hue of the ink layer. The ink film and the thermosensitive recording paper are overlapped separably with an ink surface of the ink film and a coloring surface of the thermosensitive recording paper facing each other.

The recording paper is fed at a predetermined feedrate to a first thermal head disposed on the paper path, which head melts ink of the ink film to form a transferred image, and the ink film is peeled from the thermosensitive recording paper to perform recording in the first hue. Recording in the second hue is carried out by coloring the thermosensitive recording paper by a second thermal head after correction regarding the scanning line has been completed.

9 Claims, 11 Drawing Figures

TWO-COLOR RECORDING PAPER AND METHOD AND RECORDING APPARATUS UTILIZING THE TWO-COLOR RECORDING PAPER

This is a division of application Ser. No. 181,896, filed Aug. 27, 1980, now U.S. Pat. No. 4,328,977.

BACKGROUND OF THE INVENTION

This invention relates to two-color recording paper, and more particularly to two-color recording paper on which a two-color pattern or picture can be recorded in response to chrominance signals in a facsimile or the like system, and recording method and apparatus utilizing the two-color recording paper.

Conventionally, two-color recording in facsimile apparatuses and printers has been carried out by using, for example, a thermosensitive recording system as disclosed in an article entitled "Thermal recording paper", by Noboru Yamato, THE JOURNAL OF THE INSTITUTE OF IMAGE ELECTRONICS ENGINEERS OF JAPAN, Vol. 4 (4), P185 (1975). In such a recording system, two types of leuco dyes having different melting points and hues are attached with a developer and various additive materials and coated on a substrate to form thereon two coloring layers, and temperature of a thermal head which consists of arrays of resistive elements is controlled so as to achieve two-color recording in different combinations of hues such as in blue and red and/or black and red.

In the system, however, when red is recorded at a higher temperature, a lower temperature recording color, black for example, appears around each red dot, resulting in a poor color separation and poor picture quality. Moreover, the thermal head which operates at high temperatures wastes in relatively short time. Attempts were made to cope with this problem. For example, discoloring materials which act on the lower temperature developer at temperatures exceeding a predetermined value were used as disclosed in an article entitled "Two-color thermosensitive recording paper", by Kiyoshi Niki et al., The Text for the 3rd National Convention of THE INSTITUTE OF IMAGE ELECTRONICS ENGINEERS OF JAPAN, May 1975. However, this method does not yet attain to solve the above-mentioned problem. The thermal head is heated to much higher temperatures to produce a large temperature difference resulting in a shorter service life. In addition, the scanning speed is slow in this method, since the width of pulses applied is prolonged.

Another two-color recording apparatus used in the facsimile is of an ink-jet recording. This apparatus has already been put in practice; however, it still relies on the mechanical scanning system.

SUMMARY OF THE INVENTION

It is therefore a primary object of the present invention to provide two-color recording paper on which two-color recording pictures can be recorded with high quality and at relatively low and equal or substantially equal temperature of thermal heads.

Another object of the present invention is to provide recording method and apparatus utilizing the two-color recording paper.

According to one aspect of the present invention, there is provided two-color recording paper comprising an ink film including a thin film base and an ink layer of a first hue coated on the film base, said ink layer containing a mixture of a colored material such as dye with a thermoplastic material which is solid at ordinary temperature and becomes fluid at high temperature; and a thermosensitive recording paper including a substrate, and a coloring layer coated on the substate and containing a developer which colors in a second hue different from the hue of said ink layer, said ink film and said thermosensitive recording paper being overlapped separably with an ink surface of said ink film and a coloring surface of said thermosensitive recording paper facing each other.

According to another aspect of the present invention, there is provided a recording method utilizing two-color recording paper comprising the steps of:

feeding two-color recording paper, said paper comprising an ink film having a thin film base and an ink layer of a first hue coated on the film base, said ink layer containing mixture of a colored material such as dye with a thermoplastic material which is solid at ordinary temperature and becomes fluid at high temperature, and a thermosensitive recording paper having a substrate, and a coloring layer coated on the substrate and containing a developer which colors in a second hue different from the hue of said ink, said ink film and said thermosensitive recording paper being overlapped separably with an ink surface of said ink film and a coloring surface of said thermosensitive recording paper facing each other;

melting ink of said ink film by a first thermal head at a first position on the paper path, to transfer the melted ink onto the coloring surface of said thermosensitive recording paper;

peeling said ink film from said thermosensitive recording paper at a second position on the paper path, to produce a transferred image in the first hue on said thermosensitive recording paper; and coloring the coloring layer of said thermosensitive recording paper by a second thermal head at a third position on the paper path, to produce an image in the second hue on said thermosensitive recording paper.

According to still another aspect of the present invention, there is provided a recording method utilizing two-color recording paper comprising the steps of:

feeding a thermosensitive recording paper having a substrate and a coloring layer containing a developer coated on the substrate;

coloring the coloring layer of said thermosensitive recording paper at a first position on the paper path, to produce an image in a first hue;

feeding said thermosensitive recording paper along said paper path together with an ink film having a thin film base and an ink layer of a second hue coated on the film base, said ink layer containing a mixture of a colored material such as dye with a thermoplastic material which is solid at ordinary temperature and becomes fluid at high temperature, said ink film and said thermosensitive recording paper being separably overlapped, with an ink surface of said ink film and a coloring surface of said thermosensitive recording paper facing each other;

melting ink of said ink film at a second position on said paper path, to transfer the melted ink into the coloring surface of said thermosensitive recording paper; and peeling said ink film from said thermosensitive recording paper at a third position on said paper path, to produce a transferred image in the second hue on the coloring surface of said thermosensitive recording paper.

According to still another aspect of the present invention, there is provided a recording apparatus utilizing two-color recording paper comprising:

means for feeding at a predetermined feedrate two-color recording paper comprising an ink film having a thin film base and an ink layer of a hue coated on the film base and containing a mixture of a colored material such as dye with a thermoplastic material which is solid and becomes fluid at high temperature, and a thermosensitive recording paper having a substrate and a coloring layer coated on the substrate and containing a developer coloring differently from said ink, said ink film and said thermosensitive recording paper being overlapped separably with an ink surface of said ink film and a coloring surface of said thermosensitive recording paper facing each other;

a first thermal head disposed at a first position on the paper path;

a second thermal head disposed on the paper path with a predetermined distance away from said first thermal head;

means for peeling said ink film from said thermosensitive recording paper in a direction at a predetermined angle measured from the surface of said recording paper, said means being interposed between said first and second thermal heads; and electrical circuit means comprising a drive circuit for driving said first thermal head, another drive circuit for driving said second thermal head, and a delay circuit for delaying operation of said second thermal head relative to operation of said first thermal head by a time period in which said recording paper is moved for said predetermined distance.

BRIEF DESCRIPTION OF THE DRAWINGS

Other objects and advantages of the present invention will be apparent from the following detailed description taken in conjunction with the accompanying drawings in which.

DESCRIPTION OF THE PREFERRED EMBODIMENTS

Figure 1:
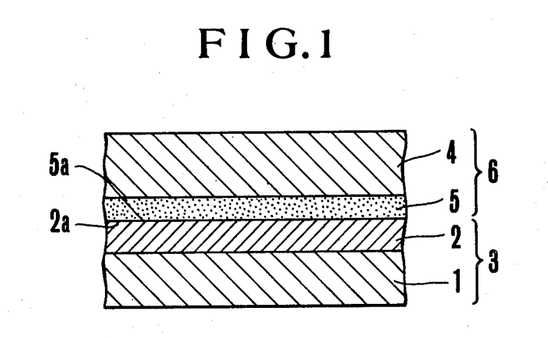
FIG. 1 is an enlarged, partial sectional view of two-color recording paper embodying the present invention.

Referring now to FIG. 1, there is shown in sectional form two-color recording paper embodying the present invention which comprises a film base 1 made of thin paper, a polyester film, a polyimide film or the like, and an ink layer 2 containing a mixture of a thermoplastic material which is solid at normal temperature and becomes fluid in the form of liquid or viscous fluid at high temperature, and colored materials such as dyes. The ink layer 2 of a hue of black is coated on the film base 1 to constitute an ink film 3. Coated on a substrate 4 is a red-coloring layer 5 containing leuco dye, a developer and various additive materials. The layer 5 is normally colorless but potentially colors in red. The substrate 4 and red-coloring layer 5 constitute usual thermosensitive recording paper 6.

An ink surface 2a of the ink layer 2 mates with a coloring surface 5a of the coloring layer 5 so that both the layers overlap, and the ink film 3 is separable from the thermosensitive recording paper 6 at the interface of surfaces 2a and 5a. Although not shown in the figure, an adhesive which does not prevent the separation of ink film 3 and recording paper 6 may be applied between the ink surface 2a and the coloring surface 5a, as will be described later.

A recording method utilizing the two-color recording paper will now be explained.

Figure 2:
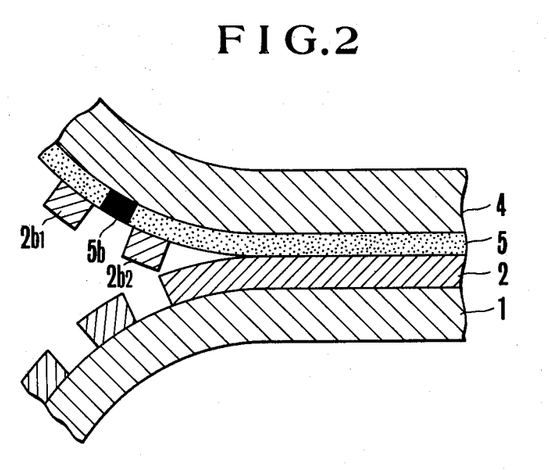
FIG. 2 is a sectional view of the recording paper of FIG. 1, showing the formation of a transferred image and colored image.

First, the ink film 3 is heated through the film base 1 by a thermal head (not shown) which consists of arrays of resistive elements, so that ink 2 is melted and transferred onto the coloring layer 5 of the thermosensitive recording paper 6. Thereafter, the ink film 3 is peeled off or separated from the thermosensitive recording paper 6 to obtain transferred black image patterns 2b1 and 2b2 as shown in FIG. 2. Finally, a portion other than the transferred image patterns 2b1 and 2b2 on the coloring layer 5 of recording paper 6 is heated by another thermal head (not shown), so that a red image pattern 5b is obtained as shown in FIG. 2.

As can be seen from the above description, in two-color recording paper according to the present invention, transferred black image patterns 2b1 and 2b2 form projections on the coloring face, so that the portions of the coloring surface corresponding to the image patterns 2b1 and 2b2 are covered with the projections and are not visible even if they have colored.

Experimental details of ink film 3 and thermosensitive recording paper 6 are given below.

Ink 2 coated on the film base 1 is a mixture of colored material and thermoplastic material, as mentioned above, and the melting point of the ink can be varied by changing the mixing ratio of these materials. In the experiment, carnauba wax as the thermoplastic material and carbon black as the colored material were mixed with a lubricant to produce ink having a melting point of 60° C. approximately. The ink in an amount of 4 g/m² was coated on the film base 1 made of paper for use in capacitors having a thickness of 12 μm to form the ink film 3.

Two kinds of coloring layers 5 of thermosensitive recording paper 6 were prepared based on coloring reaction of leuco dye with a phenol family or another acid material. A dye of fluoran family is used to obtain red hue.

Figure 3:
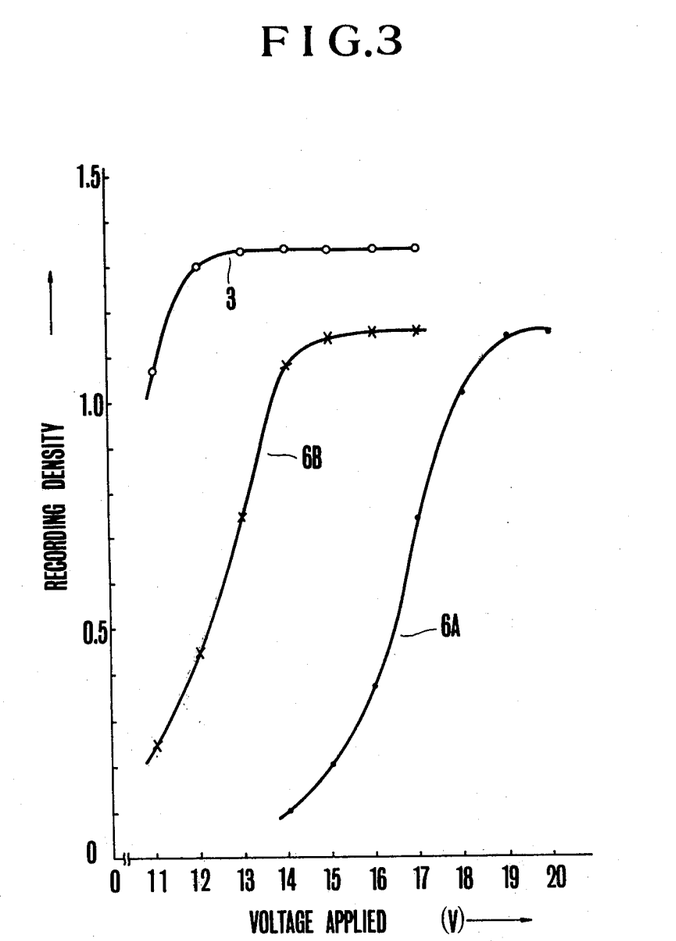
FIG. 3 is a graph showing the recording density characteristics of an ink film and two types of thermosensitive recording paper.

FIG. 3 shows the recording density characteristic curves for ink film 3 and two kinds of thermosensitive recording paper 6A and 6B having different coloring density characteristics, where abscissa represents voltage applied to the thermal head for 3 ms and ordinate recording density. This graph shows that ink film 3 attains to the saturation density with less heating energy than that for thermosensitive recording papers 6A and 6B.

The ink film 3 is then mated with the individual thermosensitive recording papers 6A and 6B so that the ink surface and coloring surface oppose each other, and ink film 3 was heated through film base 1 by means of the thermal head. Heated ink 2 was melted and transferred to the coloring surface of the thermosensitive recording paper 6, and black image patterns were obtained when the ink film 3 was peeled off or separated from the thermosensitive recording paper 6.

As shown in FIG. 3, under the application of voltage of 14 V, the thermosensitive recording paper 6A has an insufficient density to color whereas the density of the ink film 3 is saturated. In this case, a clear black image without blur could be obtained on the coloring surface of the thermosensitive recording paper. With the thermosensitive recording paper 6B, the coloring density characteristics attained to the saturation density at the same voltage, but a clear black image could also be obtained because red colored portions of the recording paper were covered by the projections of ink patterns 2b1 and 2b2 transferred and as a result the red colored portions faded into black. Thus, according to the present invention, conditions for driving the thermal head, 14 V and 3 ms voltage for example, can be applied commonly to both ink transfer and coloring, thereby allowing a single power source to be used for driving the thermal heads for ink transfer and coloring. This simplifies the structure of recording apparatus.

Figure 4:
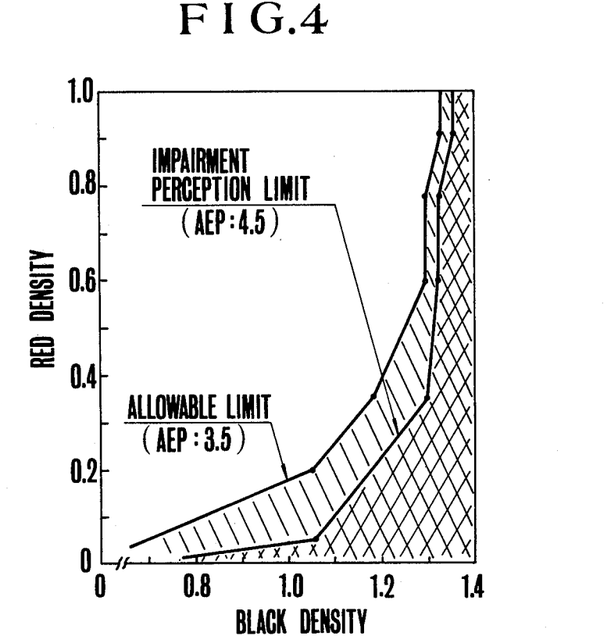
FIG. 4 is a graph useful in evaluating the density relationship between two colors.

However, in the recording apparatus according to the present invention, the density of the red tue under the black inked image can deteriorate the picture quality, and thus the density relationship between two colors has a significant meaning. FIG. 4 shows the relationship between black density and red density, in which curves having average evaluation points (AEP) 3.5 and 4.5 are plotted, where the evaluation point is defined as:

| Very annoying | 1 |
| Annoying | 2 |
| Slightly annoying | 3 |
| Perceptible but not annoying | 4 |
| Imperceptible | 5 |

It can be seen from the graph that if the ink density is 1.3 or more, a satisfactory picture quality can be obtained regardless of the density of red which colors under the ink. The ink density of 1.3 was obtained under the following conditions:

Thickness of film base: 12 $\mu$m, Amount of coated ink: 4 g/m$^2$, Thermal head voltage: 12 to 13 V, Voltage application time: 3 ms.

Finally, the thermal head was brought into contact with the coloring surface of thermosensitive recording paper 6, and was heated by being applied with a voltage which is sufficient to allow the paper 6 to be saturated in desity. A clear two-color image of black and red was obtained through a sequence of the above process.

The melting point of ink 2 of ink film 3 is preferably 40° to 100° C. in consideration of the operating condition (storage performance) of the apparatus and heating energy, and the melting viscosity is preferably 30 to 150 cps in view of transfer efficiency. The proper amount of ink is 1 to 10 g/m$^2$; below this range, the desity is too low, and above this range, the picture quality (resolution) is deteriorated and the necessary heating energy is increased. The thickness of film base 1 is preferably 10 to 50 $\mu$m. A thinner film base requires less heating energy to attain the saturation density, however, it is liable to wrinkle the ink film 3 by heating. Wrinkling can be prevented by adhering the ink surface of ink film 3 and the coloring surface of thermosensitive recording paper 6. A satisfactory result was obtained by using, as adhesive, microcrystalline wax.

It should be noted that it is not always necessary to maintain the above-mentioned conditions in the present invention. Instead, various alternations are possible depending on the coloring condition of thermosensitive recording paper 6 and operating condition of the recording apparatus.

As can be seen from the above description, when thermosensitive recording paper 6 is made such that its coloring layer colors at a higher temperature than the transfer temperature of ink 3, the recording paper 6 does not color during transfer, and thus a clear black image without blur can be recorded. Even if the above condition is not satisfied, red colored portion of the recording paper 6 is covered up by transferred ink and thus a black image, so far it is seen, can be recorded. In addition, for black and red recording as in the case of this embodiment, black can be stressed by mixing a blue dye in ink appropriately. Heating energy for recording can be reduced by making the thickness of ink film 3 smaller and the melting point of ink 2 lower. The hue of ink 2 can be changed easily, and a variety of colors are available. Since it is possible to make thermosensitive recording paper 6 color in a variety of hues the material can be selected extensively and less heating energy suffices for recording.

According to the present invention, the recording condition does not depend on a specific color, black for example, but can be made equal for both colors, black and red for example. Thus, the thermal head driving circuit can be used commonly for both colors, and so a high-speed recording as the momo-color thermal recording can be achieved.

The invention will now be described by way of a facsimile system. A facsimile receiver apparatus embodying the present invention by making use of the two-color recording paper is shown in FIGS. 5A and 5B.

Figure 5A:
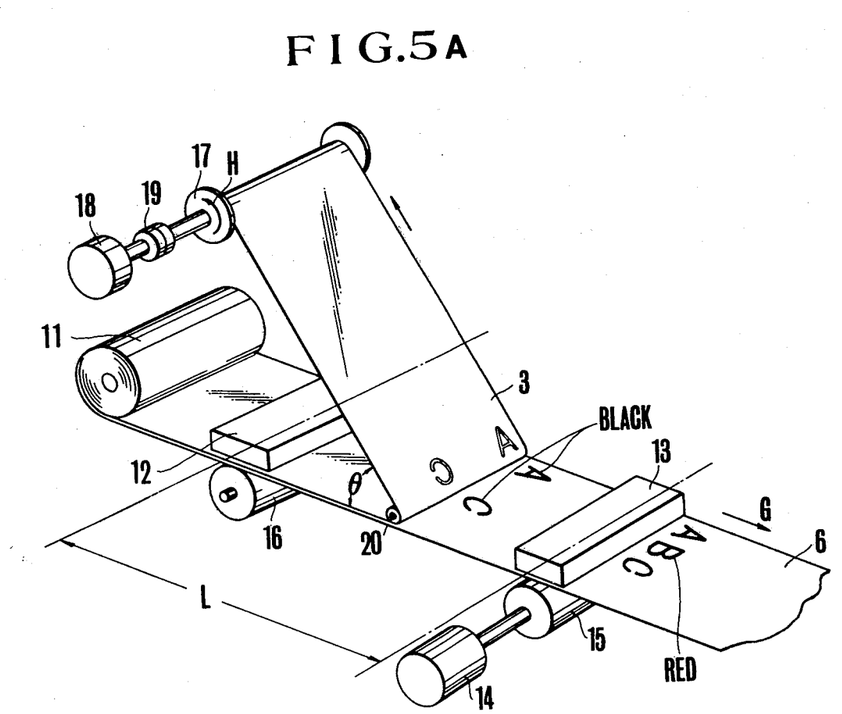
FIG. 5A is a perspective view of an embodiment of recording apparatus which uses the two-color recording paper shown in FIG. 4.
Figure 5B:
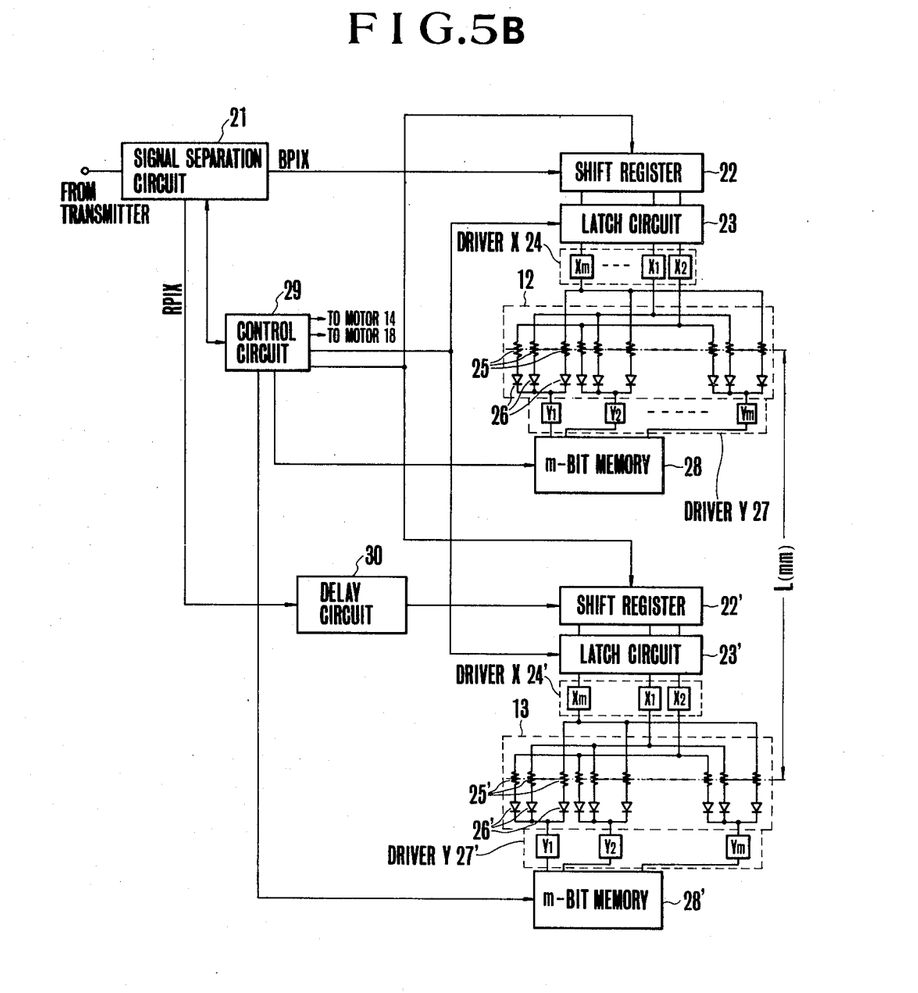
FIG. 5B is a circuit diagram of an electric circuit used in the recording apparatus shown in FIG. 5A.

FIG. 5A shows a mechanical structure of the apparatus, where reference number 11 designates a roll of two-color recording paper which is made up by overlapping or mating together an ink film 3 and a thermosensitive recording paper 6 with the blank ink surface and the red coloring layer surface facing each other. Reference number 12 designates a thermal head consisting of hundreds of resistive elements which are arrayed at a constant interval in contact with the ink film 3 such that the resistive elements corresponding to image signals are heated to melt blank ink in the ink film 3 so as to cause the melted ink to be transferred onto the thermosensitive recording paper 6. Reference number 13 designates a thermal head having the same structure as that of the thermal head 12, and it is so located that its resistive elements are in contact with the coloring surface of the thermosensitive recording paper 6.

Reference number 14 designates a motor which drives the recording paper 6 at a predetermined feedrate in the direction shown by arrow G, and 15 a driving rubber roller coupled to the shaft of the motor 14 for pressing the coloring surface of recording paper 6 to the resistive elements of thermal head 13 and also driving the recording paper 6. Reference number 16 designates a rubber roller rotatably mounted for pressing ink film 3 and thermosensitive recording paper 6 to the resistive elements of thermal head 12. Reference number 17 designates a take-up mechanism for winding ink film 3 after transfer recording, 18 a motor for rotating the take-up mechanism 17 in the direction shown by arrow H, and 19 an overload relief clutch. Reference number 20 designates a guide located between thermal heads 12 and 13 on the paper path for separating ink film 3 from thermosensitive recording paper 6 after the paper has been recorded by the thermal head 12.

Figure 6:
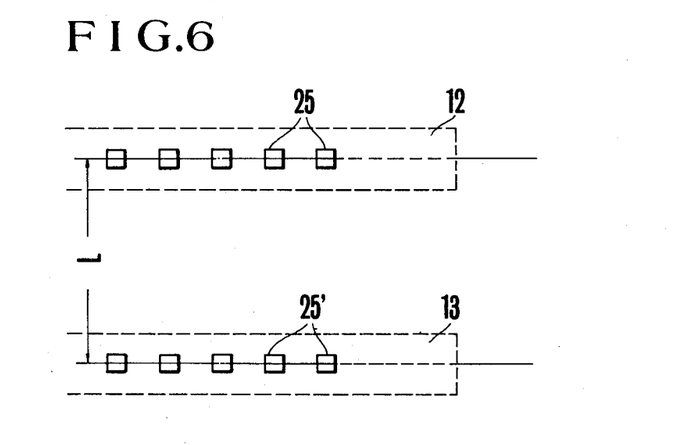
FIG. 6 is a plan view showing positional relationship between two thermal heads.

The take-up mechanism 17 and guide 20 are supported in such a manner that the ink film 3 is applied with a predetermined tension after recording in order to avoid slackening and faulty separation and also the peel-off angle $\theta$ between the separated ink film 3 and the recording paper 6 is maintained at a predetermined angle. Thermal heads 12 and 13 are placed in parallel with a distance L, as shown in FIG. 6.

FIG. 5B shows an electrical circuit for operating the mechanism shown in FIG. 5A.

Reference number 21 designates a signal separation circuit for separating a black and red information signal from a transmitter (not shown) into a video signal and a sync signal and also for separating the video signal through arithmetic processing into a signal BPIX which corresponds to black picture elements (including white picture elements) and a signal RPIX which corresponds to red picture elements (including the white picture elements). Reference numbers 22 and 22' represent shift registers for converting the serial black and red signals into respective parallel signals, and 23 and 23' latch circuits for latching signals from the shift registers 22 and 22', respectively, in units of m bits. Reference numbers 24 and 24' designate drivers X, respectively comprised of drivers X1, X2, ... Xm, which amplify latched signals so that they are applied to thermal heads 12 and 13 in units of m bits, 25 and 25' resistive elements heated by the amplified signals, 26 and 26' diodes for blocking reverse current, 27 and 27' drivers Y respectively comprised of drivers Y1, Y2, ... Ym, 28 and 28' m-bit memories for selecting the drivers Y (27, 27') so as to designate blocks of the m-bit resistive elements 25 and 25', 29 a control circuit for generating a clock and a phsase signal to control each section, and 30 a delay circuit for delaying only red signal RPIX of each scanning line (within one frame) by storing the red signal for each scanning line. The delay circuit 30 has a storage capacity enough to cover the product of distance L (mm) between the resistive elements 25 and 25' of respective thermal heads 12 and 13, scanning line density d (lines/mm) and the number of resistive elements 25' do (dots/mm), that is L×d×do, and it stores and reads out signals under the control of the control circuit 29. Red signals stored in the delay circuit 30 are read out after the recording paper has advanced by L×d lines following storage of red signals for one scanning line, and the signals are recorded on the recording paper. After that, signals are read out sequentially in units of scanning line to ensure that correction regarding the scanning line can be completed.

Figure 7:
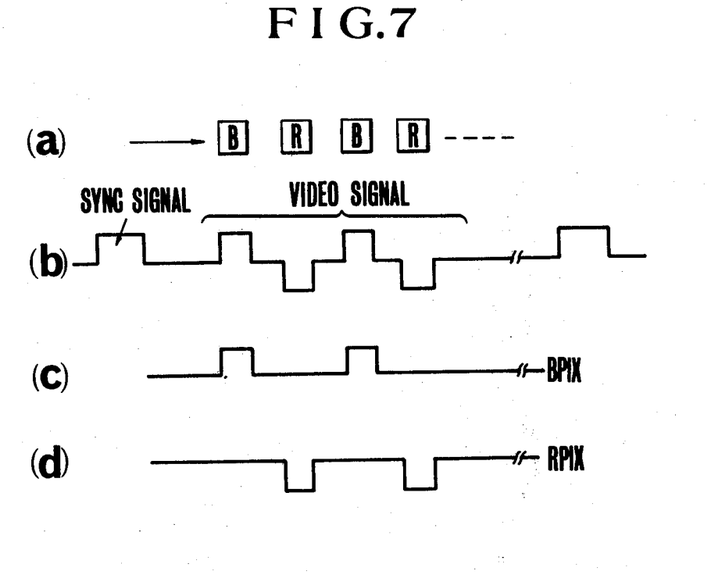
FIG. 7 is a waveform diagram showing electrical signals for recording an image in red and black.

Operation of the electrical circuit will be explained as follows. On the transmitter, a master document is scanned for reading out black and red picture elements as shown in FIG. 7(a) and photoelectrically converted to produce an image signal. The image signal is mixed with a sync signal as shown in FIG. 7(b) and sent out in a time-series fashion. Initially, the transmitter sends only the sync signal which activates the control circuit 29 shown in FIG. 5B in the receiver, so that synchronization is made between the transmitter and the receiver. At the same time, the motor 14 in FIG. 5A starts rotating to feed ink film 3 and thermosensitive recording paper 6 at a predetermined feedrate through the rubber roller 15. The motor 18 also starts rotating to take up the ink film 3. Next, document information or video signal is transmitted from the transmitter.

When the video signal on the first scanning line, as shown in FIG. 7(b) for example, is received, the signal separation circuit 21 separates the sync signal and the video signal, and each section of the circuit is controlled according to the sync signal. The signal separation circuit 21 also separates the black signal BPIX (including the white signal) and the red signal RPIX (including the white signal), as shown in FIGS. 7(c) and 7(d), respectively. The contrpl circuit 29 starts counting of the phase signal. The black signal BPIX on the first scanning line is converted into parallel signals by the shift register 22, and the parallel signals are switched by the drivers X1 to Xm and drivers Y1 to Ym for carrying out a matrix control, so that respective resistive elements 25 on the thermal head 12 are heated. The heat melts black ink 2 in ink film 3 through the film base 1, so that an image is recorded on the thermosensitive recording paper 6. The same operation for the black signal alone is carried out sequentially for the second and third scanning lines, and so on. Black ink 2 transferred to the recording paper 6 is made visible after ink film 3 has been peeled from the recording paper 6 by the guide 20, and then a black record is obtained.

On the other hand, the red signal RPIX on the first scanning line is stored in the delay circuit 30 in units of scanning line, while the above-mentioned black signal for the first scanning line is being recorded. Red signals for the second and third scanning lines, and so on, are also stored sequentially in the same way. When the scanning line on which the black signal for the first scanning line has been recorded reaches the resistive elements 25' of the thermal head 13, the stored red signal for the first scanning line is read out by the control circuit 29 and recorded. Accordingly, black and red picture elements for the first scanning line are combined at the position of the resistive elements 25' of the thermal head 13, so that the picture elements shown in FIG. 7(a) are reproduced. Red signals for the second and third scanning lines, and so on, are recorded sequentially in the same way as mentioned above, and finally a two-color picture based on black and red is obtained.

The recording paper is so constructed that the transferred image by ink 2 in ink film 3 is completely separated from the colored image on the thermosensitive paper 6, thus obtaining a clear two-color recorded picture without blur in both black and red.

Figure 8:
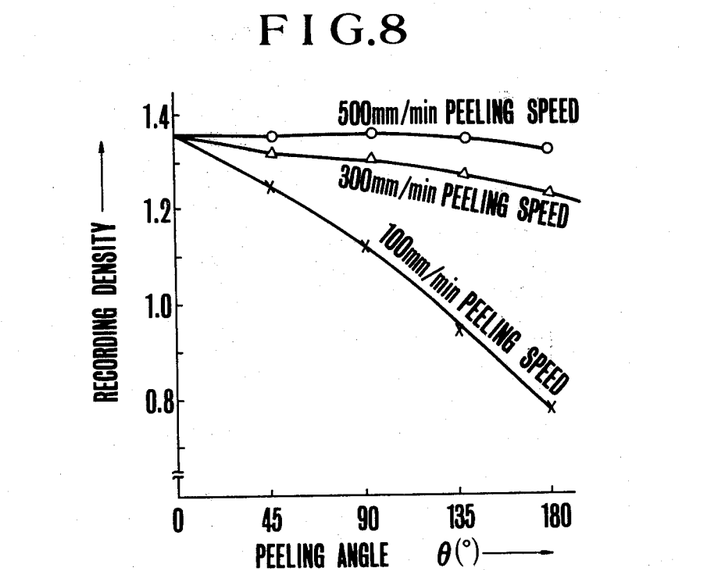
FIG. 8 is a graph showing the relationship between the peeling angle and the recording density.

What is most important in peeling ink film 3 is a peeling angle $\theta$ between the ink film 3 and the recording paper 6. FIG. 8 is a graph of the recording density characteristics obtained as the result of the experiment, showing the relationship between the peeling angle $\theta$ and the recording density when a black image is recorded continuously by the thermal head 12. It can be seen from the graph that a higher recording density is obtained when the peeling angle θ is small at a constant peeling speed. The recording density also depends on the peeling speed, since ink film 3 retains ink 2 depending on the peeling resistance and viscosity of the ink 2 and the state of the surface of the ink film 3. In conclusion, the peeling angle should be as small as possible, particularly it should be smaller than 90°.

In the above embodiment, ink film 3 and thermosensitive recording paper 6 are simply overlapped or mated together. However, it is also possible to form a roll of recording paper by gluing the ink film 3 and thermosensitive recording paper 6 to a degree that they can be peeled off. Thermal heads 12 and 13 are respectively associated with pressure rollers 16 and 15; however, a common pressure roller may be employed with which both thermal heads are associated.

Figure 9:
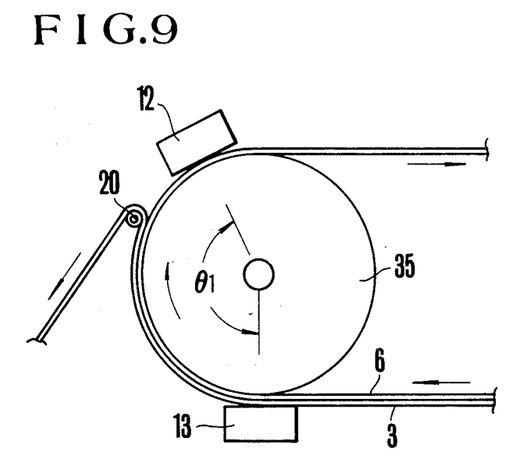
FIG. 9 is a partial structural view of another embodiment of recording apparatus according to the present invention.

FIG. 9 shows another embodiment of the present invention, in which a single pressure roller 35 is rotated by a drive mechanism (not shown) in the direction shown by arrow, so that ink film 3 and thermosensitive recording paper 6 are transported in contact with thermal heads 13 and 12. Other portions of this embodiment are the same as those shown in FIG. 5A. The drive mechanism which is not shown in the figure is coupled to the roller 35. In such an arrangement with a single pressure roller 35 being in contact with both thermal heads 13 and 12, the structure of the apparatus can be simplified. Moreover, when the diameter of the pressure roller 35 is made smaller and also angle O1 between the heads 13 and 12 in contact with the roller is made smaller, the distance between the thermal heads 13 and 12 can be made smaller, and thus the capacity of the delay circuit 30 which delays the operation of the thermal head 12 can be reduced.

Figure 10:
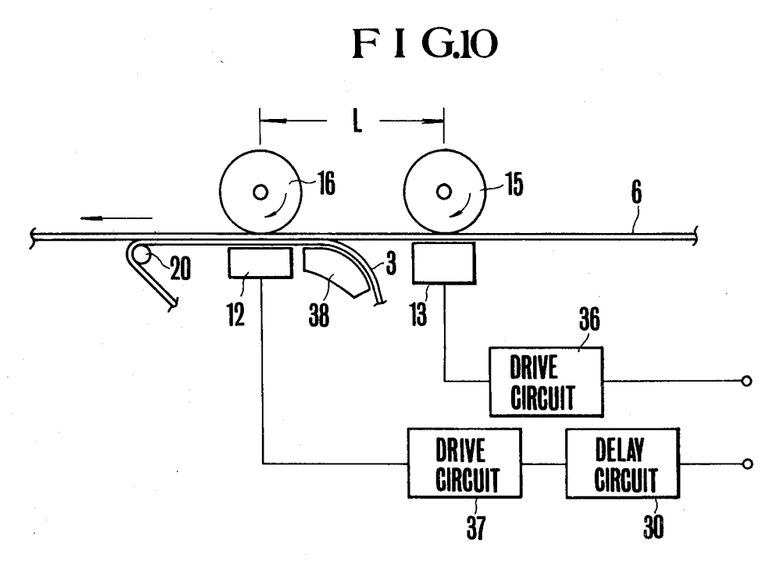
FIG. 10 is a partial structural view of still another embodiment of recording apparatus according to the present invention.

In the above embodiment the thermal head 12 melts ink 2 of the ink film 3 to transfer the melted ink to the thermosensitive recording paper 6, and then ink film is peeled. Alternatively, it is also possible to color the recording paper 6 by thermal head 13 in advance, then the thermosensitive recording paper 6 and ink film 3 are overlapped near the thermal head 12 so as to melt and transfer ink 2 of the ink film 3 to the thermosensitive recording paper 6. An embodiment of such arrangement is shown in FIG. 10 where identical components to those in FIG. 5A are omitted. In FIG. 10, a drive circuit 36 includes components 22', 23', 24', 27', and 28' in FIG. 5B, and a drive circuit 37 includes components 22, 23, 24, 27, and 28 in FIG. 5B. A delay circuit 30 is coupled to the drive circuit 37 for the thermal head 12. A guide 20 is disposed downstream the thermal head 12, so that ink film 3 is fed into a gap between the thermal head 12 and a roller 16. Recording operation is identical to that of the structure shown in FIG. 5A and will not be explained here. In this embodiment, however, ink film 3 is liable to wrinkle when it is overlapped with thermosensitive recording paper 6. Therefore, it is recommended in this embodiment that adhesive be provided between thermosensitive recording paper 6 and ink film 3.

In the above embodiments, delay circuit 30 is provided for the recording apparatus; however, it can be eliminated when a memory is provided for the transmitter.

Since the two-color recording paper as described above can be recorded by application of identical heating energy regardless of the recording condition, thermal heads 13 and 12, and drive circuits 36 and 37 can advantageously be made common.

As explained above, two-color recording paper according to the present invention is formed by overlapping separably an ink film made up of a thin film base and ink coated on it which becomes fluid at high temperature and a thermosensitive recording paper made up of a substrate and developer coated on it which colors differently than the ink, with their ink surface and coloring surface facing each other. The ink of the ink film is melted and transferred to the thermosensitive recording paper by means of a first thermal head. Thus, even if the thermosensitive recording paper colors, the colored portion is covered up by the ink. Then, the thermosensitive recording paper is colored by a second thermal head, and a clear two-color recorded picture without blur can be obtained.

According to the recording method of the present invention, the ink film is peeled off the thermosensitive recording paper after ink of the ink film has been melted and transferred to the recording paper by the first thermal head, and then the coloring layer of the recording paper is colored by the second thermal head. This process reduces heating energy for each thermal head as compared with prior art two-color recording method. Consequently, the service life of the thermal head is extended, and the heating pulse width can be minimized to permit speed-up of recording.

What is claimed is:

1. A recording method utilizing two-color recording paper comprising the steps of:

feeding two-color recording paper, said paper comprising an ink film having a thin film base and an ink layer of a first hue coated on the film base, said ink layer containing a mixture of a colored material such as dye with a thermoplastic material which is solid at ordinary temperature and becomes fluid at high temperature, and a thermosensitive recording paper having a substrate, and a coloring layer coated on the substrate and containing a developer which colors in a second hue different from the hue of said ink, said ink film and said thermosensitive recording paper being overlapped separably with an ink surface of said ink film and a coloring surface of said thermosensitive recording paper facing each other;

melting ink of said ink film by a first thermal head at a first position on the paper path, to transfer the melted ink onto the coloring surface of said thermosensitive recording paper;

peeling said ink film from said thermosensitive recording paper at a second position on the recording paper path, to produce a transferred image in the first hue on said thermosensitive recording paper; and coloring the coloring layer of said thermosensitive recording paper by a second thermal head at a third position on the paper path, to produce an image in the second hue on said thermosensitive recording paper.

2. A recording method utilizing two-color recording paper according to claim 1, wherein said ink film is peeled from said thermosensitive recording paper in a direction of 90° or less measured from the coloring surface of said thermosensitive recoring paper.

3. A recording method utilizing two-color recording paper according to claim 1, wherein said transferred image takes the form of a projection on the coloring surface of said thermosensitive recording paper.

4. A recording method utilizing two-color recording paper according to claim 1, wherein heating energy for said first and second thermal heads is identical.

5. A recording method utilizing two-color recording paper comprising the steps of:
    feeding a thermosensitive recording paper having a substrate and a coloring layer containing a developer coated on the substrate;
    coloring the coloring layer of said thermosensitive recording paper at a first position on the paper path, to produce an image in a first hue;
    feeding said thermosensitive recording paper along said paper path together with an ink film having a thin film base and an ink layer of a second hue coated on the film base, said ink layer containing a mixture of a colored material such as dye with a thermoplastic material which is solid at ordinary temperature and becomes fluid at high temperature, said ink film and said thermosensitive recording paper being separably overlapped, with an ink surface of said ink film and a coloring surface of said thermosensitive recording paper facing each other;
    melting ink of said ink film at a second position on said paper path, to transfer the melted ink onto the coloring surface of said thermosensitive recording paper; and
    peeling said ink film from said thermosensitive recording paper at a third position on said paper path, to produce a transferred image in the second hue on the coloring surface of said thermosensitive recording paper.

6. A recording method utilizing two-color recording paper according to claim 5, wherein said ink film is peeled from said thermosensitive recording paper in a direction of 90° or less measured from the coloring surface of said thermosensitive recording paper.

7. A recording apparatus utilizing two-color recording paper comprising:
    means for feeding at a predetermined feedrate two-color recording paper comprising an ink film having a thin film base and an ink layer of a hue coated on the film base and containing a mixture of a colored material such as dye with a thermoplastic material which is solid and becomes fluid at high temperature, and a thermosensitive recording paper having a substrate and a coloring layer coated on the substrate and containing a developer coloring differently from said ink, said ink film and said thermosensitive recording paper being overlapped separably with an ink surface of said ink film and a coloring surface of said thermosensitive recording paper facing each other;
    a first thermal head disposed at a first position on the paper path;
    a second thermal head disposed on the paper path with a predetermined distance away from said first thermal head;
    means for peeling said ink film from said thermosensitive recording paper in a direction at a predetermined angle measured from the surface of said recording paper, said means being interposed between said first and second thermal heads; and
    electrical circuit means comprising a drive circuit for driving said first thermal head, another drive circuit for driving said second thermal head, and a delay circuit for delaying operation of said second thermal head relative to operation of said first thermal head by a time period in which said recording paper is moved for said predetermined distance.

8. A recording apparatus utilizing two-color recording paper according to claim 7, wherein said paper feed means comprises pressing rollers disposed opposite said first and second thermal heads so that said recording paper is pressed onto said first and second thermal heads, and a paper drive power source coupled to one of said pressing rollers.

9. A recording apparatus utilizing two-color recording paper according to claim 7, wherein said paper feed means comprises a single pressing roller disposed opposite said first and second thermal heads, so that said recording paper is pressed onto said first and second thermal heads, and a paper drive power source coupled to said pressing roller.

* * * * *